Figure 4:
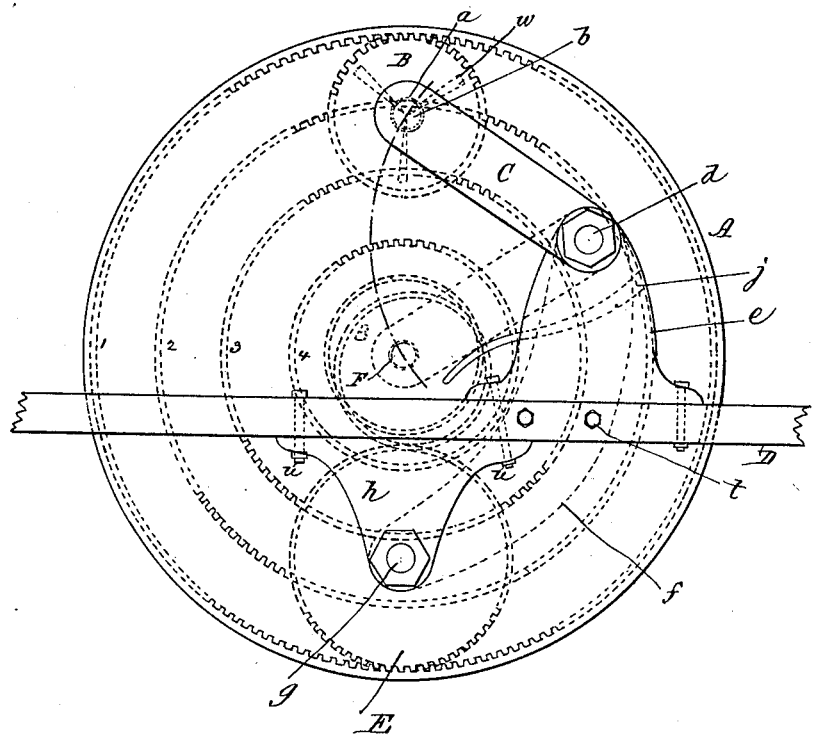

H. LUTZ.
INTERNAL VARIABLE SPEED FRICTION TRANSMISSION DEVICE.
APPLICATION FILED JULY 13, 1906.
904,272.
Patented Nov. 17, 1908.
2 SHEETS—SHEET 1.
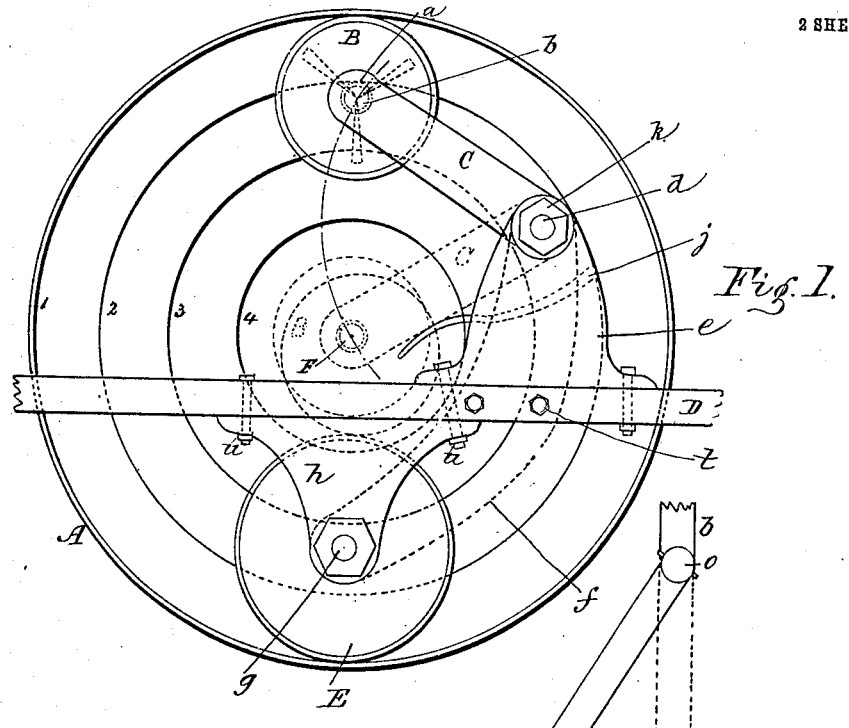
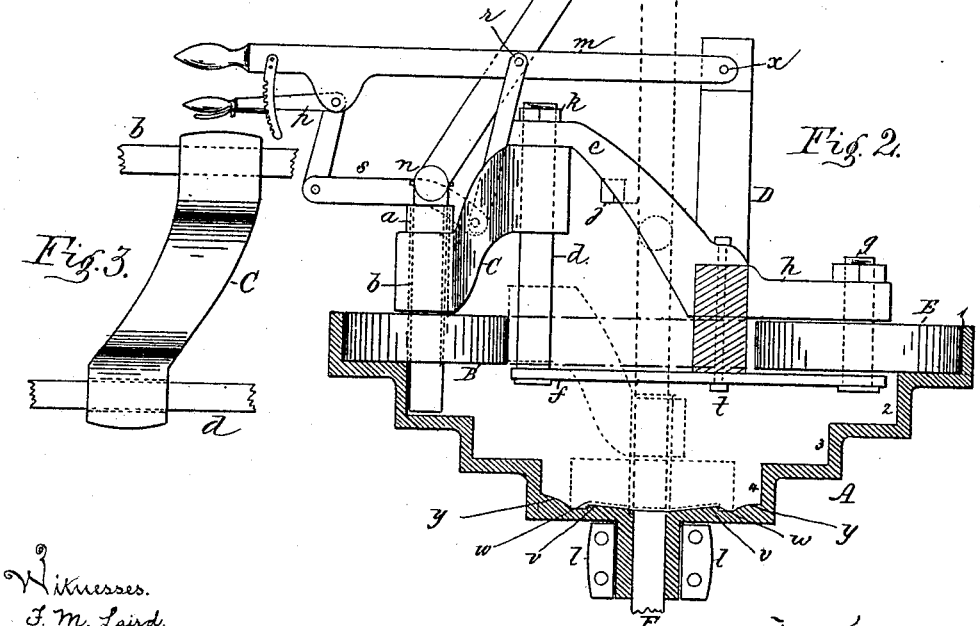

UNITED STATES PATENT OFFICE.

HERBERT LUTZ, OF STONY CREEK, ONTARIO, CANADA, ASSIGNOR OF THREE-SEVENTHS TO INTERNAL SPEED AUTOMOBILE COMPANY, OF HAMILTON, CANADA.

INTERNAL VARIABLE-SPEED FRICTION TRANSMISSION DEVICE.

No. 904,272.        Specification of Letters Patent.        Patented Nov. 17, 1908.

Application filed July 13, 1906. Serial No. 326,100.

*To all whom it may concern:*

Be it known that I, HERBERT LUTZ, a citizen of the Dominion of Canada, and residing at Stony Creek, in the county of Wentworth, in the Province of Ontario, Canada, have invented a certain new and useful Internal Variable-Speed Friction Transmission Device; and I do hereby declare that the following is a full, clear, and exact description of the construction and operation of the same.

The invention relates to an internal variable speed friction transmission device, which is specially adapted for automobiles, launches or boats, drills, lathes, &c., and it consists of certain novel features of combination and construction of parts, the preferred form whereof will be hereinafter set forth.

The prime object of my invention among others, is to provide a machine that will be easy to operate, safe and reliable, and which can be driven at various speeds without being liable to slip.

A further object of my invention is to provide means for reversing the motion of the device.

My invention comprises, first, a stepped wheel having a series of different sized internal annular recesses, the wheel being keyed on a shaft, which may be placed horizontal for automobiles and vertical for drills and like machinery. Second, a friction wheel on a sliding sleeve, carried on a rotating shaft, and a movable arm made to impinge frictionally on the inside surface of one of the internal recesses of the said stepped wheel. Third, devices for moving the said friction wheel to any one of the recesses of the said wheel to vary the speed at will. Fourth, devices for reversing the motion of the wheel and operating shaft consisting of a secondary friction wheel, made to run in the largest recess of the stepped wheel and made to act as a guide to overcome the pressure of the main friction wheel when it is operating in any one of the recesses of the stepped wheel. Fifth, devices for throwing the top friction wheel into any of the recesses in the stepped wheel or onto the reverse wheel.

I attain these objects by the mechanism illustrated in the accompanying drawing, in which,—

Figure 1, shows an end view of my machine detached from any vehicle. Fig. 2, is a partly sectional view. Fig. 3, is a view of the movable arm detached from the device. Fig. 4, is an end view of the stepped wheel showing the recesses, friction and reverse wheels, provided with gear teeth.

Similar letters refer to similar parts throughout the several views.

In the drawing A, represents the large stepped wheel constructed of any metal, preferably of aluminum or iron, and formed with a series of internal annular recesses from large to small, 1, being the largest and 4, the smallest and 2, 3, the intermediate ones. The said wheel A, is keyed on a shaft F, held in a frame and stops at the entrance of the smallest recess 4.

A main driving friction wheel B, is feathered to a sleeve $a$, on a short shaft $b$, which also passes through the outer end of a movable arm C, which is fulcrumed pivotally on a stationary shaft $d$, held in a bracket $e$, which is bolted to the frame D, at one end, and the inner end of said shaft is journaled in a sheet metal bracket $f$, which in turn is bolted to the inner part of the main frame D, as shown by dotted lines $f$, Fig. 1. It will be seen that the said movable arm C, carrying the friction wheel B, can allow the latter to move and be adapted to rotate in any of the recesses 1, 2, 3 or 4 of the stepped wheel A, to alter the speed, and also allows it to drop for reversing to the reverse wheel E, which is a wheel carried by a stud $g$, held in a bracket $h$, bolted to the frame D, and the inner end of the said stud $g$, is held in the bottom end of the metal bracket $f$, and allows the said reverse wheel E to run in the outer annular recess 1 of the stepped wheel A, when the friction wheel B is lowered to come in contact with the said reverse wheel (as shown by dotted lines Fig. 1) when the stepped wheel A is desired to be reversed by the operator. The said reverse wheel E, also acts as a counter brace to the said large wheel A.

$j$ is a spring one end of it attached to the bracket $e$, and the inner end made to pass obliquely downwards and is for the purpose of holding up the arm C from dropping on to the reverse wheel E when the stepped wheel A is not required to be reversed. When the said wheel A is required to be reversed the arm C is pressed against the spring $j$, which allows the drive wheel B to come in contact with the reverse wheel E causing the stepped wheel A to be reversed.

$k$, is a nut screwed on to the end of the shaft $d$, to hold the arm C in place. F, is a shaft upon which the large stepped wheel is keyed and $l$ is a bearing through which the said shaft passes, and by which it is held.

The variable speed is accomplished by devices for changing the friction drive wheel B, from one recess to the other by means of the large lever $m$, one end of which is pivoted at the point $x$, to the frame D, as shown at Fig. 2, and a connecting link $r$, is pivoted to the said lever, and to the arm C, and causes the friction wheel B, to be moved into the different recesses 1, 2, 3, 4, of the stepped wheel A, and the said friction wheel B, is caused to frictionally engage the inner surface of the stepped wheel A, by means of the bell crank lever $p$, pivoted to the lever $m$, through the connecting link $s$, attached to it and to the said arm C.

It will further be seen that the shaft $b$, which carries the friction wheel B, has two universal joints $n$, and $o$, for the purpose of allowing the friction drive wheel B, to adjust itself to the different recesses 1, 2, 3, 4, of the large stepped wheel A.

$t$, is a bolt for holding the bracket $e$, to the frame D, and $u$, $u$, are bolts securing brackets $h$, and $e$, to the frame D.

The device as shown when applied to drive an automobile is placed between the engine or motor and the wheels to be driven; the center shaft F, carrying the stepped wheel will be connected to wheels to be driven either by gear, sprocket or other means, the engine or other driving power will be connected to the shaft $b$, driving the friction wheel B, through the arm C, and when the said friction drive wheel B, is in the outermost recess 1 of the stepped wheel A, it will cause slow speed, and also will be in a position for reversing; and as the arm C, is lowered by the lever $p$, and brought in by the lever $m$, the said friction drive wheel B, can be changed to any of the other recesses of the stepped wheel A and also brought to the center and engaged in the smallest central recess 4, and held up therein by the small lever $p$, until the speed of the wheel A, is almost at the speed of the friction wheel B. There are clutch projections $v$, on the inside of the smallest recess 4, of the stepped wheel A, and corresponding notches $w$, formed on the inner surface of the said friction drive wheel B, into which the projections $v$, $v$, enter and when the drive wheel B is pushed into the said smallest recess 4, these notches and projections act as a clutch device to hold the said drive wheel B in the recess 4 of the stepped wheel when a direct and high speed is desired.

$y$, represents an annular projection around the innermost corner of the stepped wheel recess 4, for the purpose of keeping the wheel B from engaging with the clutch projections $v$, when the said wheel is operating on the sides of the recess 4.

It will further be observed that the large stepped wheel A will be turned smooth on both sides so that it will readily receive the friction drive wheel B, in the inner recesses.

It will still further be observed that when the driving wheel B, is operating or running in any one of the annular recesses 1, 2, 3, or 4, of the stepped wheel A, the reverse wheel E, acts as a counter brace to the said recessed wheel A.

It will still further be observed that the internal recesses 1, 2, 3, 4, of the stepped wheel A, can be toothed or cogged, and the driving wheel B, also cogged to mesh into the cogs of the said recesses and also the reverse wheel E, can be cogged to engage with the cogged recesses of the said stepped wheel, to produce the same result as the friction device hereinbefore described without altering the essential features of the invention.

Having thus described my device and its advantages, what I claim as my invention, and desire to secure by Letters Patent, is,—

1. A friction power transmitting mechanism comprising a main frame, a stepped wheel, a driven shaft on which said wheel is mounted, a parallel sleeved shaft, a friction drive wheel carried on said sleeved shaft and adapted to rotate in any of the recesses of the stepped wheel, a main driving shaft, a ball-and-socket joint connection between said last mentioned shafts, a movable arm (C) pivotally attached to the shaft ($b$) of the drive wheel, a parallel shaft ($d$) to which said arm is also pivotally attached, a hand lever ($m$) pivotally attached to the frame, a connecting rod or link ($r$) pivotally attached to the said lever ($m$) and to the movable arm (C) a smaller lever $p$ a connecting rod ($s$) pivotally attached to the movable arm (C) and to the smaller lever ($p$), the large lever ($m$) being adapted to move the said drive wheel from one recess to another of the stepped wheel, for the purpose of changing the speed or reversing the direction of rotation of the driven shaft and the smaller lever ($p$) adapted to hold the drive wheel (B) in any of the recesses of the stepped wheel.

2. A friction power transmitting mechanism comprising a main frame, a stepped wheel, a driven shaft on which said wheel is mounted, a parallel sleeved shaft, a friction drive wheel carried on said sleeved shaft and adapted to rotate in any one of the recesses of the stepped wheel, a main driving shaft, a ball-and-socket joint connection between said last mentioned shafts, a movable arm (C) pivotally attached to the shaft of the drive wheel, a parallel shaft ($d$) to which said arm is also pivotally attached, a bracket attached to the said latter shaft, a reverse wheel (E) pivotally attached to said bracket to engage the largest recess in said stepped wheel, an operating lever (m) pivoted to the main frame, a connecting rod (r) pivotally connected to said lever and to the movable arm (C), a second lever pivoted to the first lever, a connecting rod (s), pivotally attached to the movable arm and to the second lever, said levers being adapted to move said drive wheel from one recess to another of the stepped wheel and to hold it in any recess or in engagement with the reverse wheel for the purpose of changing the speed or reversing the direction of rotation of the driven shaft.

Dated at Hamilton, Ontario, Canada, this 4th day of July, 1906.

HERBERT LUTZ.

Signed in the presence of—
WM. BRUCE,
F. M. LAIRD.